(12) United States Patent
Liu

(10) Patent No.: US 7,394,378 B2
(45) Date of Patent: Jul. 1, 2008

(54) ELECTRONIC TAGGED BOX

(75) Inventor: Ying-Chang Liu, Taipei Hsien (TW)

(73) Assignee: Cheng Loong Corporation, Taipei Hsien (TW)

( * ) Notice: Subject to any disclaimer, the term of this patent is extended or adjusted under 35 U.S.C. 154(b) by 208 days.

(21) Appl. No.: 11/263,960

(22) Filed: Nov. 2, 2005

(65) Prior Publication Data

US 2007/0096916 A1    May 3, 2007

(51) Int. Cl.
*G08B 13/14* (2006.01)

(52) U.S. Cl. .................................. 340/572.1; 340/572.8

(58) Field of Classification Search ............. 340/572.1, 340/572.7, 572.8; 235/492; 343/834
See application file for complete search history.

(56) References Cited

U.S. PATENT DOCUMENTS

| | | | |
|---|---|---|---|
| 6,922,173 B2 * | 7/2005 | Anderson | 340/572.1 |
| 7,064,668 B2 * | 6/2006 | Porad | 340/572.8 |
| 2005/0077353 A1 * | 4/2005 | Oishi et al. | 235/385 |
| 2006/0044110 A1 * | 3/2006 | Napolitano | 340/572.8 |
| 2006/0044206 A1 * | 3/2006 | Moskowitz et al. | 340/572.8 |
| 2006/0254815 A1 * | 11/2006 | Humphrey et al. | 174/380 |

* cited by examiner

*Primary Examiner*—Thomas Mullen
(74) *Attorney, Agent, or Firm*—Apex Juris, PLLC; Tracy M Heims

(57) ABSTRACT

An electronic tagged box comprises a box body; a buffer layer mounted inside the box body; an absorber mounted on one side of the buffer layer; and a RFID tag mounted outside the box body corresponding to the buffer layer, whereby receiving distance and range of the RFID tag can be increased.

7 Claims, 4 Drawing Sheets

ELECTRONIC TAGGED BOX

FIELD OF THE INVENTION

The present invention relates an electronic tagged box that suitable for various paper boxes or the likes, and more particularly to an electronic tagged box that increases receiving distance and range of RFID tag.

BACKGROUND OF THE INVENTION

In the conventional logistics, container transportation or commodities has mostly utilized bar codes for identification, wherein the bar codes are usually placed on the outmost layer of the commodities so it is hardly free of filth or damage. Once the bar codes get dirty, the bar-code reader cannot recognize them anymore so the identification of the bar codes becomes difficult. Besides, the bar codes make the whole procedure complicated and inefficient since the attaching and detaching steps of bar codes, which are respectively performed before and after identification, decrease progress rate of the whole procedure. As a result, better efficiency can be provided and significant time and cost can be saved by adoption of another identification method for omitting these attaching and detaching steps.

RFID (Radio Frequency Identification) system has been developed to fulfill these requirements. RFID system is a kind of identification system that utilizes radio waves to exchange desired information by wireless communication between readers and RFID tags (e.g. cards) that are attached to human body or objects, wherein each tag includes a memory IC, an antenna and a covering layer. The information stored in the tag of the RFID system is rewritable because of its digital format. As a result, the tags can be reused through recycling. For the passive RFID tags, there is no need to maintain or preserve them since they equip with no battery. The RFID tags can normally perform communication when they are covered with papers, wood or plastics. However, when covered with metal, no communication can be obtained.

In view of the aforementioned conventional deficiency, there is a need to increase receiving distance and range of RFID tag. As a result, the present inventor makes diligent studies to provide consumers with an electronic tagged box that capable of increasing receiving distance and range of RFID tag according to the motive of the present invention,

SUMMARY OF THE INVENTION

It is a main objective of the present invention to provide an electronic tagged box that applies buffer layer and radio wave absorber to the package so as to increase receiving distance and range and facilitate usage such that convenience and practicability are attained.

It is another objective of the present invention to provide an electronic tagged box that provides unaffected receiving distance and range when the metal or liquid object is packaged in the box.

The aforementioned aspects and advantages of the present invention will be readily clarified in the description of the preferred embodiments and the enclosed drawings of the present invention.

DETAILED DESCRIPTION OF THE PREFERRED EMBODIMENT

Figure 1:
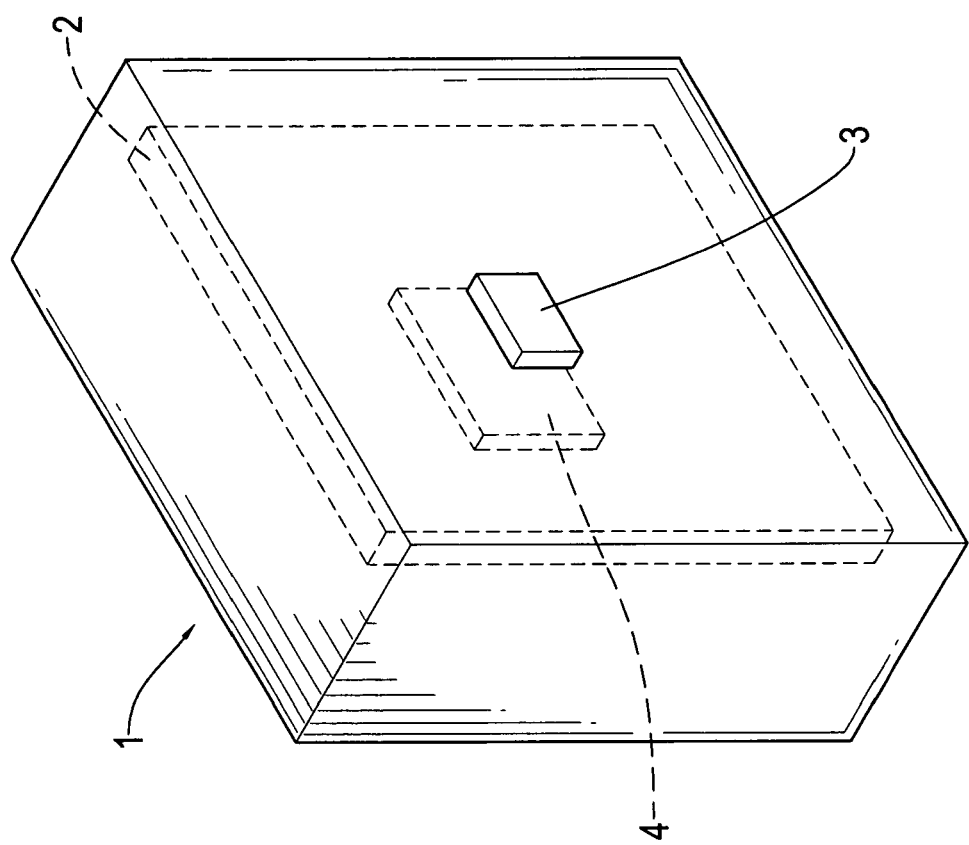
FIG. 1 is a schematic, three-dimensional view showing the preferred embodiment of the present invention.
Figure 2:
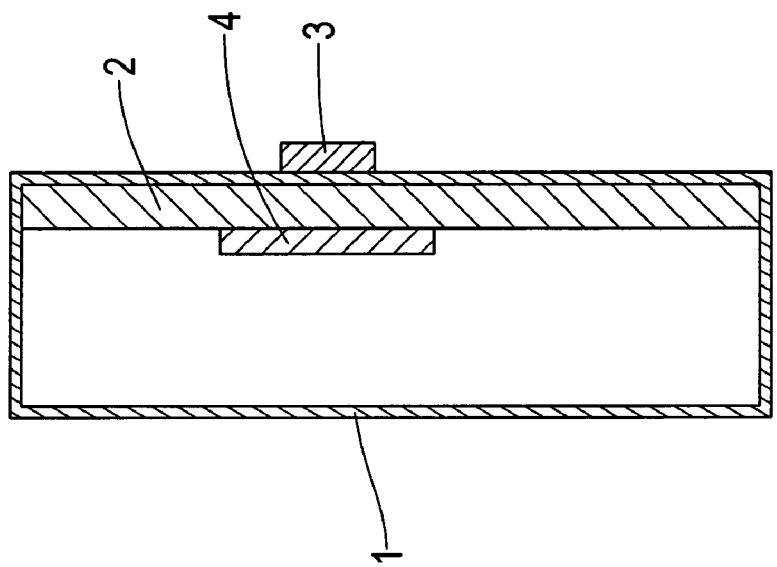
FIG. 2 is a schematic, cross-sectional view showing the preferred embodiment of the present invention.

Referring to FIG. 1 and FIG. 2, the preset invention relates to an electronic tagged box that comprises a box body 1, a buffer layer 2, a RFID (Radio Frequency Identification) tag 3 and an absorber 4.

The buffer layer 2 is mounted inside the box body 1 and made of paper, plastics or polystyrene. The RFID tag 3 is mounted on the outside of the box body 1 corresponding to the buffer layer 2, wherein the tag 3 further includes a wireless transmitter, a wireless receiver and a memory IC. The wireless transmitter, and the wireless receiver are designed for communicating identification data stored in the memory IC. The tag 3 is a passive RFID tag and produces electric power by means of electromagnetic induction between the tag and its environment. The absorber 4 is mounted on one side of the buffer layer 2 for absorbing the radio waves reflected from an object in the box body 1 and then transforming the absorbed radio waves into thermal energy. The operating frequency of the absorber 4 is ranged from 1 GHz to 40 GHz such that it is applicable to a specific frequency, multiple frequencies or broadband frequencies, and that it is compatible with light, thin, short and small electronic products. As a result, the receiving distance and range of the RFID tag 3 can be increased.

The electronic tagged box is constituted by the above-mentioned structures. Referring to FIG. 1 and FIG. 2, the present invention is featured with the buffer layer 2 mounted inside the box body 1, the RFID tag 3 mounted outside the box body 1 corresponding to the buffer layer 2, and the absorber 4 mounted on one side of the buffer layer 2 by which the receiving distance and range of the RFID tag 3 can be increased to facilitate usage.

Figure 3:
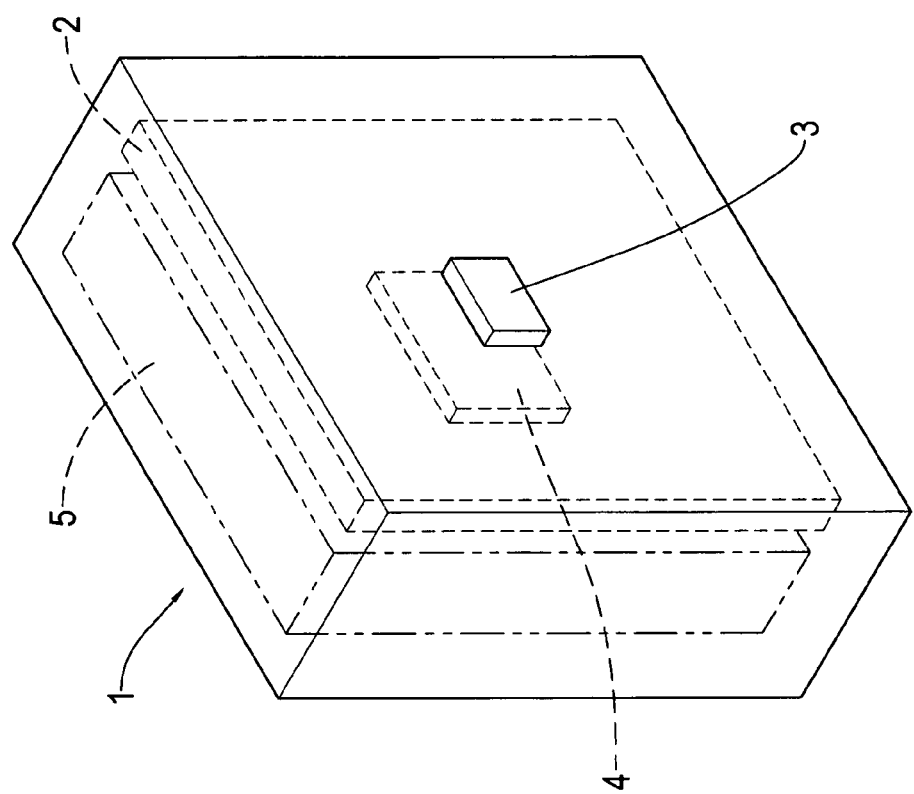
FIG. 3 is a schematic view showing the practice of the preferred embodiment of the present invention.
Figure 4:
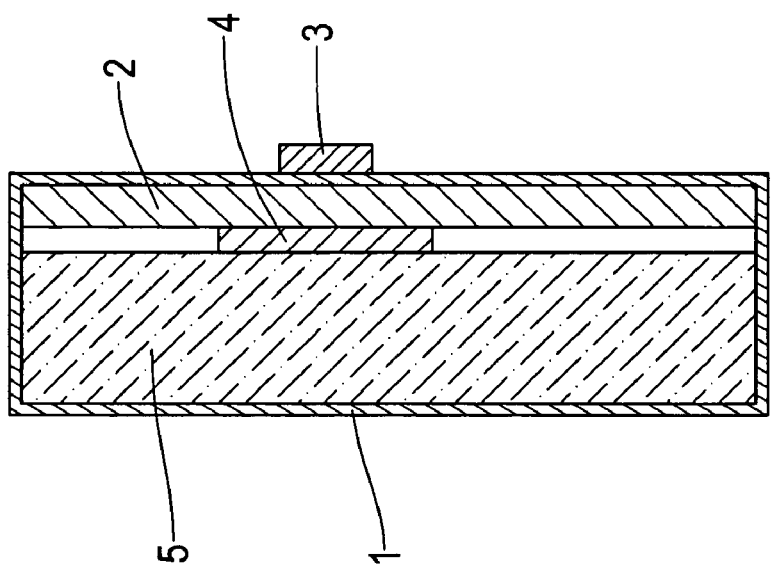
FIG. 4 is a schematic, cross-sectional view showing the practice of the preferred embodiment of the present invention.

Referring to FIG. 3 and FIG. 4, the practice of the preferred embodiment of the present invention is illustrated. The absorber 4 that mounts on one side of the buffer layer 2 can absorb the radio waves reflected from the object 5 in the box body 1 such that the receiving distance and range of the RFID tag 3 can be increased so as to offset the signal reduction caused when the object 5 packaged in the box body 1 is made of metal or liquid material.

In summary, the present invention increases the receiving distance and range of the RFID tag and satisfies patentability. Accordingly, it is submitted for a patent.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments, which do not depart from the spirit and scope of the invention.

What the invention claimed is:

1. An electronic tagged box comprising:
   a box body;
   a buffer layer mounted on an interior surface of a wall of the box body;
   a radio wave absorber mounted on one side of the buffer layer; and a RFID tag mounted on an exterior surface of the wall of the box body opposite the buffer layer, whereby receiving distance and range of the RFID tag is increased.

2. The electronic tagged box of claim 1, wherein the buffer layer is made of paper.

3. The electronic tagged box of claim 1, wherein the buffer layer is made of plastics.

4. The electronic tagged box of claim 1, wherein the buffer layer is made of polystyrene.

5. The electronic tagged box of claim 1, wherein the absorber has an operating frequency ranged from 1 GHz to 40 GHz.

6. The electronic tagged box of claim 1, wherein the RFID tag comprises a wireless transmitter, a wireless receiver and a memory IC, and wherein the wireless transmitter and the wireless receiver are designed for communicating identification data stored in the memory IC.

7. The electronic tagged box of claim 1, wherein the RFID tag is a passive REID tag and produces electric power by means of electromagnetic induction between the RFID tag and its environment.

* * * * *